United States Patent
Torama (10) Patent No.: US 11,216,968 B2
(45) Date of Patent: Jan. 4, 2022

(54) FACE DIRECTION ESTIMATION DEVICE AND FACE DIRECTION ESTIMATION METHOD

(71) Applicant: Mitsubishi Electric Corporation, Tokyo (JP)

(72) Inventor: Ryosuke Torama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 36 days.

(21) Appl. No.: 16/486,420

(22) PCT Filed: Mar. 10, 2017

(86) PCT No.: PCT/JP2017/009726
§ 371 (c)(1),
(2) Date: Aug. 15, 2019

(87) PCT Pub. No.: WO2018/163404
PCT Pub. Date: Sep. 13, 2018

(65) Prior Publication Data
US 2020/0034981 A1 Jan. 30, 2020

(51) Int. Cl.
*G06T 7/70* (2017.01)
*G06K 9/00* (2006.01)
*H04N 5/232* (2006.01)

(52) U.S. Cl.
CPC ............ *G06T 7/70* (2017.01); *G06K 9/00228* (2013.01); *G06K 9/00335* (2013.01); *H04N 5/23219* (2013.01); *G06T 2207/30201* (2013.01)

(58) Field of Classification Search
CPC .. G06K 9/00228; G06K 9/00; G06K 9/00335; H04N 5/2353; H04N 5/33;
(Continued)

(56) References Cited

U.S. PATENT DOCUMENTS

2009/0196467 A1* 8/2009 Okubo ............... G06K 9/00288
382/118
2012/0141033 A1 6/2012 Yu et al.
(Continued)

FOREIGN PATENT DOCUMENTS

| JP | 2000-97676 A | 4/2000 |
| JP | 2003-296712 A | 10/2003 |

(Continued)

OTHER PUBLICATIONS

International Search Report, issued in PCT/JP2017/009726, PCT/SA/210, dated Jun. 6, 2017.

*Primary Examiner* — Syed Haider
(74) *Attorney, Agent, or Firm* — Birch, Stewart, Kolasch & Birch, LLP (57) ABSTRACT

A face direction estimation device (10) includes a face image acquiring unit (11) acquiring a shot face image, a face detecting unit (12) detecting the face position in the face image, a face organ detecting unit (13) detecting face organs in the detected face position, a switching determining unit (14) evaluating the detected face organs, and switching between first and second face direction estimating methods in accordance with the evaluation, a first face direction estimating unit (15) estimating the face direction in accordance with a positional relationship among the detected face organs when the switching determining unit switches to the first face direction estimating method, and a second face direction estimating unit (16) calculating a face movement amount on the basis of the detected face position and estimating the face direction in accordance with the movement amount when the switching determining unit switches to the second face direction estimating method.

4 Claims, 9 Drawing Sheets

(58) Field of Classification Search
CPC ............... H04N 5/23219; G06T 7/70; G06T 2207/20081; G06T 2207/30201
See application file for complete search history.

(56) References Cited

U.S. PATENT DOCUMENTS

| | | | |
|---|---|---|---|
| 2013/0004020 A1* | 1/2013 | Yoneyama | H04N 5/232945 382/103 |
| 2014/0270370 A1* | 9/2014 | Saito | G06K 9/00288 382/103 |
| 2018/0182165 A1* | 6/2018 | Zatepyakin | G06K 9/00228 |
| 2019/0133436 A1* | 5/2019 | Arikawa | A61B 3/0008 |

FOREIGN PATENT DOCUMENTS

| | | |
|---|---|---|
| JP | 2009-237993 A | 10/2009 |
| JP | 2010-97379 A | 4/2010 |
| JP | 2012-118927 A | 6/2012 |
| JP | 2014-218140 A | 11/2014 |

* cited by examiner

FACE DIRECTION ESTIMATION DEVICE AND FACE DIRECTION ESTIMATION METHOD

TECHNICAL FIELD

The present invention relates to a face direction estimation device for and a face direction estimation method of estimating a direction of a face from a shot image of the face.

BACKGROUND ART

For example, a driver state monitoring device according to Patent Literature 1 shoots a driver's face image, detects a position of his or her face, detects face organs, such as the inner eye corner, the outer eye corner, the nose, the mouth, and the ears, from the detected position of the face, and estimates the direction of the face on the basis of a positional relationship among the face organs.

CITATION LIST

Patent Literature

Patent Literature 1: JP 2014-218140 A

SUMMARY OF INVENTION

Technical Problem

However, there is a problem in the method described in the above-mentioned Patent Literature 1 that, when it is not possible to shoot an entire face image because a face is hidden by a hand or the like or a face is turned sideways, it is difficult to estimate the direction of the face.

The present invention is made in order to solve the above problem, and it is therefore an object of the present invention to provide a technique for estimating the direction of a face even when it is not possible to shoot an entire face image.

Solution to Problem

A face direction estimation device according to the present invention includes: a face image acquiring unit acquiring a face image generated by shooting an image of a face; a face detecting unit detecting a position of the face from the face image acquired by the face image acquiring unit; a face organ detecting unit detecting face organs from the face image in the position of the face detected by the face detecting unit; a switching determining unit performing evaluation of the face organs detected by the face organ detecting unit, and switching between a first face direction estimating method and a second face direction estimating method on a basis of a result of the evaluation; a first face direction estimating unit estimating a direction of the face on a basis of a positional relationship among the face organs detected by the face organ detecting unit when the switching determining unit switches to the first face direction estimating method; and a second face direction estimating unit calculating an amount of movement of the face on a basis of the position of the face detected by the face detecting unit and estimating the face direction on a basis of the amount of movement when the switching determining unit switches to the second face direction estimating method. The switching determining unit evaluates reliability of the face organs detected by the face organ detecting unit, and evaluates quality of the face organs on a basis of both the position of the face detected by the face detecting unit, and the positional relationship among the face organs detected by the face organ detecting unit, and switches between the first face direction estimating method and the second face direction estimating method on a basis of a result of the evaluation of the reliability and a result of the evaluation of the quality.

Advantageous Effects of Invention

According to the present invention, a high-accuracy first face direction estimating method based on the positional relationship among the face organs is used usually, and, when it is not possible to shoot an entire face image because a part of the face is hidden by a hand or the like or the face is turned sideways so that it is difficult to detect the face organs, it is possible to switch the method to the second face direction estimating method in which the face direction is detected on the basis of the amount of movement of the face. Therefore, the face direction can be estimated even when it is not possible to shoot an entire face image.

DESCRIPTION OF EMBODIMENTS

Hereafter, in order to explain the present invention in more detail, some embodiments of the present invention will be described with reference to the accompanying drawings.

Embodiment 1

Figure 1:
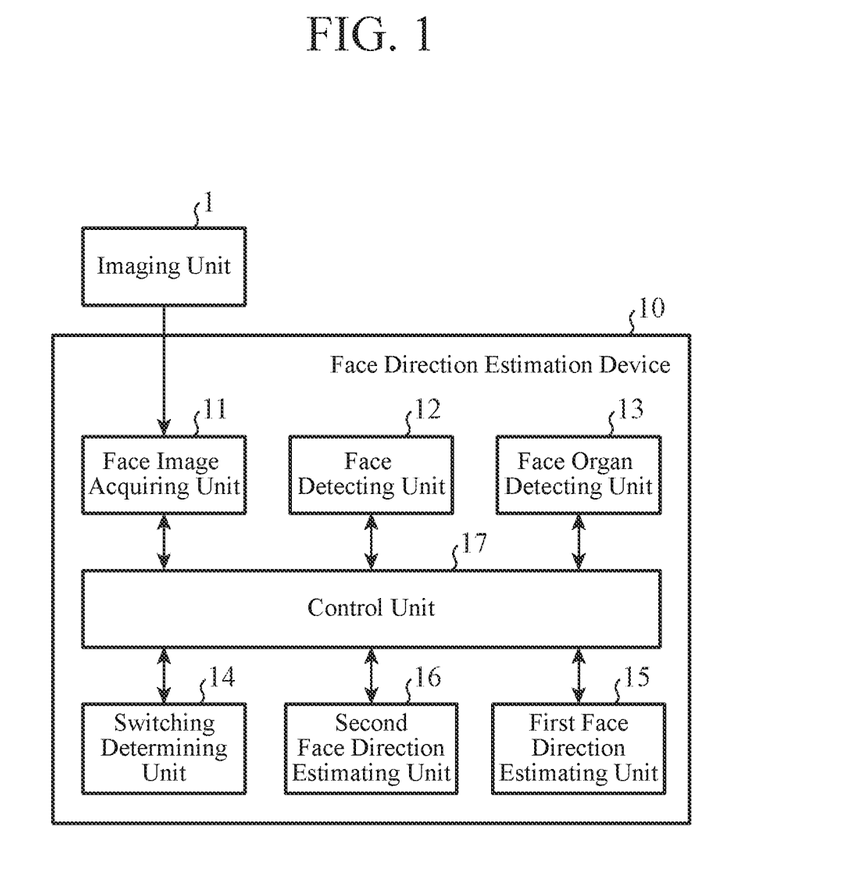
FIG. 1 is a block diagram showing an example of a configuration of a face direction estimation device according to Embodiment 1 of the present invention.

FIG. 1 is a block diagram showing an example of a configuration of a face direction estimation device 10 according to Embodiment 1 of the present invention. The face direction estimation device 10 includes a face image acquiring unit 11, a face detecting unit 12, a face organ detecting unit 13, a switching determining unit 14, a first face direction estimating unit 15, a second face direction estimating unit 16, and a control unit 17. Further, an imaging unit 1 is connected to the face direction estimation device 10, and an image shot by the imaging unit 1 is inputted to the face direction estimation device 10.

Hereafter, a case in which the face direction estimation device 10 estimates the direction of the face of an occupant in a vehicle will be shown as an example.

The imaging unit 1 shoots an image of the occupant, and inputs the shot image to the face image acquiring unit 11 of the face direction estimation device 10. The imaging unit 1 is a visible light camera or a camera using a filter for allowing only light in a near-infrared range or an infrared range to pass therethrough. In the case in which the imaging unit 1 is a camera using a filter for allowing only light in a near-infrared range or an infrared range to pass therethrough, an image of the occupant may be shot using an illuminating device for illuminating the occupant with light in the near-infrared range or the infrared range, in a state in which the occupant is illuminated with the light. When the occupant is the driver, by using the light in the near-infrared range or the infrared range, it is possible to prevent the driver from being dazzled by the illuminated light.

Figure 2:
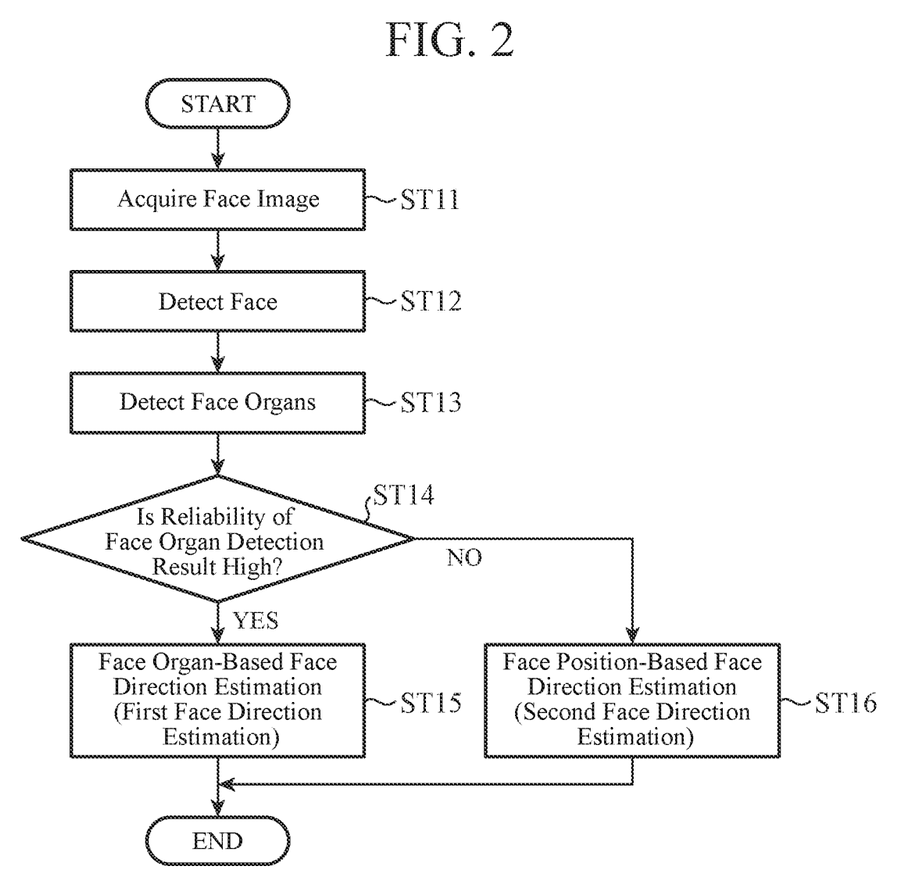
FIG. 2 is a flow chart showing an example of the operation of the face direction estimation device according to Embodiment 1 of the present invention.

FIG. 2 is a flow chart showing an example of the operation of the face direction estimation device 10 according to Embodiment 1 of the present invention.

In step ST11, the face image acquiring unit 11 acquires an image shot by the imaging unit 1 and including the face of an occupant. Not only the face but also the upper half of the body or the like of the occupant can be included in this image. Hereafter, an image including a face is referred to as a "face image." The control unit 17 outputs the face image acquired by the face image acquiring unit 11 to the face detecting unit 12.

In step ST12, the face detecting unit 12 detects the position of the face from the face image acquired by the face image acquiring unit 11. For example, the face detecting unit 12 detects an area including the face in the face image by using an identification device based on a typical algorithm, such as AdaBoost or Cascade, which uses a Haar-Like feature quantity which is an image feature quantity. Further, when the face in the face image is partially hidden by a hand or the like, the face detecting unit 12 may provide, as a face detection result, an area detected by means of object tracking using a Haar-Like feature quantity. Moreover, the face detecting unit 12 may use a typical object tracking algorithm, such as a particle filter algorithm or a template matching algorithm, for the object tracking. The control unit 17 outputs information about the face position detected by the face detecting unit 12 to the face organ detecting unit 13.

In step ST13, the face organ detecting unit 13 detects face organs from the position of the face in the face image acquired by the face image acquiring unit 11, the position being detected by the face detecting unit 12. For example, the face organ detecting unit 13 detects the positions of face organs, such as the eyes, the nose, and the mouth. Further, the face organ detecting unit 13 calculates the likelihood showing how likely it is that the detected face organs are true. The control unit 17 outputs both the positions of the face organs detected by the face organ detecting unit 13 and information about the likelihood of the face organs to the switching determining unit 14. Because well-known techniques can be used for the detection of face organs, a detailed explanation of the technique will be omitted hereafter.

In step ST14, the switching determining unit 14 evaluates the face organs detected by the face organ detecting unit 13, and switches the estimating method, on the basis of the result of the evaluation, to either of an estimating method executed by the first face direction estimating unit 15 or an estimating method executed by the second face direction estimating unit 16.

The switching determining unit 14 of Embodiment 1 evaluates the reliability of face organs detected by the face organ detecting unit 13 using the likelihood of the face organs. The switching determining unit 14 compares a predetermined reference and the likelihood of the face organs detected by the face organ detecting unit 13, determines that the reliability of the face organs is high when the likelihood is equal to or greater than the reference ("YES" in step ST14), and switches to the first face direction estimating method executed by the first face direction estimating unit 15 (step ST15). In this case, the control unit 17 outputs the position information about the face organs detected by the face organ detecting unit 13 to the first face direction estimating unit 15. Because the direction of the face is estimated on the basis of a positional relationship among the face organs in the first face direction estimating method, it is difficult to estimate the face direction with high accuracy when face organs are not detected by the face organ detecting unit 13 or when the reliability of the face organs is low. Details of such a situation will be explained later. To solve this problem, whether or not it is failed to shoot an image of the entire face because a part of the face is hidden by a hand or the like or the face is turned sideways is determined by comparing the likelihood and the reference to evaluate the reliability by means of the switching determining unit 14.

On the other hand, when the likelihood is less than the reference, the switching determining unit 14 determines that the reliability of the face organs is low ("NO" in step ST14), and switches to the second face direction estimating method executed by the second face direction estimating unit 16 (step ST16). In this case, the control unit 17 outputs the face position information detected by the face detecting unit 12 to the second face direction estimating unit 16. In the second face direction estimating method, the face direction is estimated on the basis of, instead of the position information about the face organs detected by the face organ detecting unit 13, the position information about the face detected by the face detecting unit 12. This method will be described in detail later. Thus, although the second face direction estimating method is inferior in accuracy to the first face direction estimating method, it is possible to estimate the face direction even when it is failed to shoot an image of the entire face since a part of the face is hidden by a hand or the like or the face is turned sideways.

In step ST15, the first face direction estimating unit 15 estimates the face direction on the basis of the positional relationship among the face organs detected by the face organ detecting unit 13. Hereafter, the face direction estimating method executed by the first face direction estimating unit 15 will be explained with reference to FIGS. 3A, 3B, 4A, and 4B.

Figure 3A:
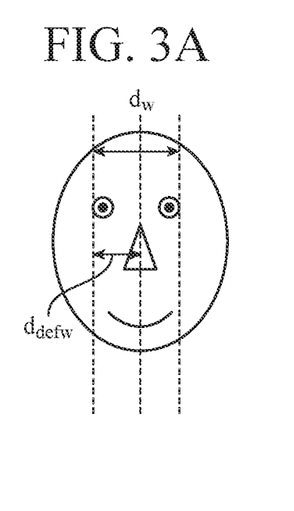
FIGS. 3A and 3B are views explaining a first face direction estimating method in Embodiment 1 of the present invention, and show a face direction with respect to a horizontal direction.
Figure 3B:
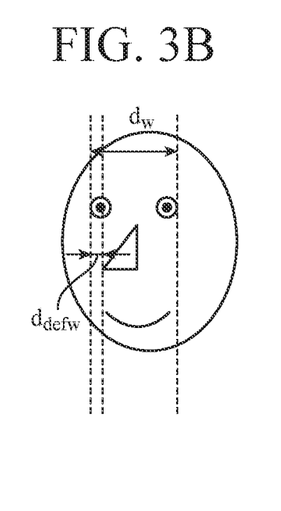

FIGS. 3A and 3B are views explaining the first face direction estimating method in Embodiment 1 of the present invention, and show the face direction with respect to a horizontal direction. When the face is directed to the front, as shown in FIG. 3A, the distance $d_{defw}$ between the right eye and the nose becomes a certain percentage of the distance $d_w$ between the right eye and the left eye. When the face is turned to either the leftward direction or the rightward direction, as shown in FIG. 3B, the ratio of the distance $d_{defw}$ between the right eye and the nose to the distance $d_w$ between the right eye and the left eye changes. In addition, the ratio of the distance $d_{defw}$ becomes small as the face is turned to the rightward direction, whereas the ratio of the distance $d_{defw}$ becomes large as the face is turned to the leftward direction. Then, the first face direction estimating unit 15 estimates the horizontal direction Yaw of the face using the following equation (1). offsetX denotes an offset for adjusting the ratio of the distance $d_{defw}$ between the right eye and the nose to the distance $d_w$ between the right eye and the left eye when the occupant is sitting on a seat and directed to the front, and is determined in accordance with a relationship of the installation position of the imaging unit 1 with respect to the position of the seat on which the occupant is.

$$rx = d_{defw}/d_w + \text{offsetX}$$

$$Yaw = a\sin(rx) \cdot 180/\pi \tag{1}$$

Figure 4A:
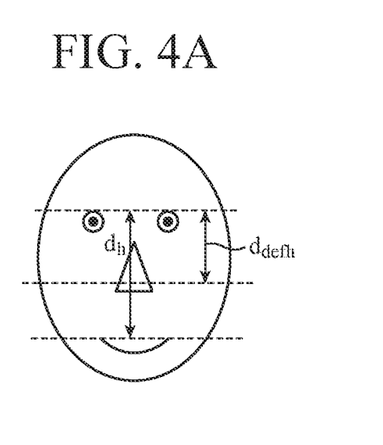
FIGS. 4A and 4B are views explaining the first face direction estimating method in Embodiment 1 of the present invention, and show a face direction with respect to a vertical direction.
Figure 4B:
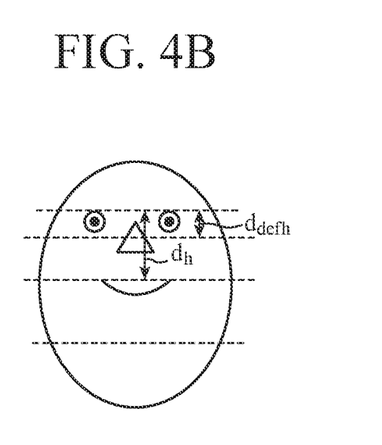

FIGS. 4A and 4B are views explaining the first face direction estimating method in Embodiment 1 of the present invention, and show the face direction with respect to the vertical direction. When the face is directed to the front, as shown in FIG. 4A, the distance $d_{defh}$ between both the eyes and the nose becomes a certain percentage of the distance $d_h$ between both the eyes and the mouth. When the face is turned to either the upward direction or the downward direction, as shown in FIG. 4B, the ratio of the distance $d_{defh}$ between both the eyes and the nose to the distance $d_h$ between both the eyes and the mouth changes. In addition, the ratio of the distance $d_{defh}$ becomes small as the face is turned to the upward direction, whereas the ratio of the distance $d_{defh}$ becomes large as the face is turned to the downward direction. Then, the first face direction estimating unit 15 estimates the vertical direction Pitch of the face using the following equation (2). offsetY denotes an offset for adjusting the ratio of the distance $d_{defh}$ between both the eyes and the nose to the distance $d_h$ between both the eyes and the mouth when the occupant is sitting on a seat and directed to the front, and is determined in accordance with the relationship of the installation position of the imaging unit 1 with respect to the position of the seat on which the occupant is.

$$ry = d_{defh}/d_h + \text{offsetY}$$

$$\text{Pitch} = a\sin(ry) \cdot 180/\pi \tag{2}$$

In step ST16, the second face direction estimating unit 16 calculates the amount of movement of the face from the position of the face detected by the face detecting unit 12, and estimates the face direction on the basis of the amount of movement. Hereafter, the face direction estimating method executed by the second face direction estimating unit 16 will be explained with reference to FIG. 5.

Figure 5:
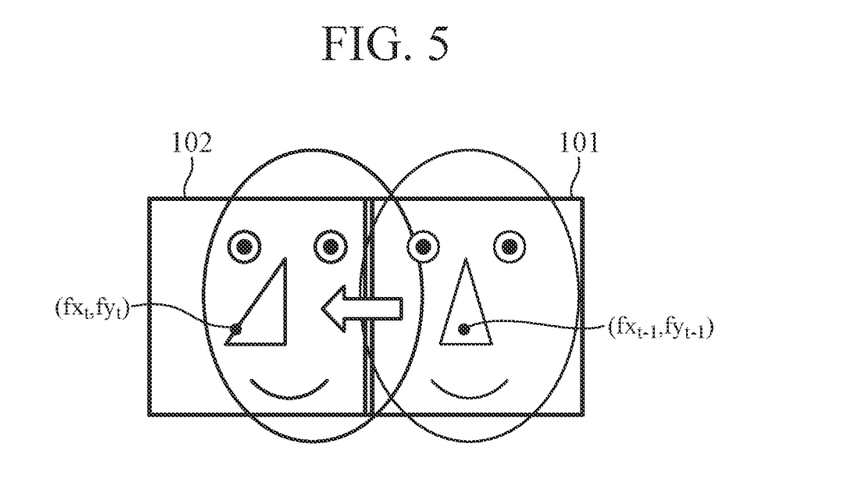
FIG. 5 is a view explaining a second face direction estimating method in Embodiment 1 of the present invention.

FIG. 5 is a view explaining the second face direction estimating method in Embodiment 1 of the present invention, and shows the face direction with respect to the horizontal direction. In the second face direction estimating method, assuming that the amount of movement of the face of the occupant in an environment in the vehicle cabin is the same as the amount of change of the face direction, the amount of movement of the face is calculated from the difference between a previous face position and the current face position, and the face direction is estimated using a linear approximate expression as given by equations (3) and (4). The parameters a, $\text{OFFSET}_{yaw}$, and $\text{OFFSET}_{pitch}$ are appropriately set values used for performing a straight line approximation with respect to the amount of movement of the face and the face direction. Particularly, $\text{OFFSET}_{yaw}$ and $\text{OFFSET}_{pitch}$ are angles of the face when the occupant is sitting on a seat and directed to the front, and is determined in accordance with the relationship of the installation position of the imaging unit 1 with respect to the position of the seat on which the occupant is.

$$fd^{Yaw}_t = a \cdot (fx_{t-1} - fx_t) + \text{OFFSET}_{yaw} \tag{3}$$

$$fd^{Pitch}_t = a \cdot (fy_{t-1} - fy_t) + \text{OFFSET}_{pitch} \tag{4}$$

The second face direction estimating unit 16 calculates the amount of movement in the horizontal direction from the difference between the x coordinate $fx_{t-1}$ of an area 101 of the face detected from the face image shot last time, and the x coordinate $fx_t$ of an area 102 of the face detected from the face image shot this time, to estimate the face direction $fd^{Yaw}_t$ in the horizontal direction using equation (3). Similarly, the second face direction estimating unit 16 calculates the amount of movement in the vertical direction from the difference between the y coordinate $fy_{t-1}$ of the area 101 of the face detected from the face image shot last time, and the y coordinate $fy_t$ of the area 102 of the face detected from the face image shot this time, to estimate the face direction $fd^{Pitch}_t$ in the vertical direction using equation (4). In this calculation, for example, the second face direction estimating unit 16 selects the center of the area 101 of the face detected by the face detecting unit 12 as the coordinates $(fx_{t-1}, fy_{t-1})$, and, also for the next frame, similarly selects the center of the area 102 of the face as the coordinates $(fx_t, fy_t)$.

Although the approximate expressions, as given by equations (3) and (4), in which the amount of movement and the face direction are modeled are used in the example explained above, no limitation is intended to this example, and, for example, the face direction can be estimated from the amount of movement using trigonometric functions similarly to equations (1) and (2).

Further, because when an occupant is sitting on a seat and directed to the front, there is an individual difference in the direction of his or her face, an error easily occurs in the estimation result when $\text{OFFSET}_{yaw}$ and $\text{OFFSET}_{pitch}$ are set to fixed values as shown in equations (3) and (4). To solve this problem, just before the switching from the first face direction estimating method to the second face direction estimating method is performed, the face direction estimated using the first face direction estimating method may be used as $\text{PRE\_FACE\_OFFSET}_{yaw}$ and $\text{PRE\_FACE\_OFFSET}_{pitch}$, as shown in equations (5) and (6). As a result, the error can be reduced comparing with that in the case in which $\text{OFFSET}_{yaw}$ and $\text{OFFSET}_{pitch}$ are used.

$$fd^{Yaw}_t = a \cdot (fx_{t-1} - fx_t) + \text{PRE\_FACE\_OFFSET}_{yaw} \tag{5}$$

$$fd^{Pitch}_t = a \cdot (fy_{t-1} - fy_t) + \text{PRE\_FACE\_OFFSET}_{pitch} \tag{6}$$

As described above, the face direction estimation device 10 according to Embodiment 1 is configured to include: a face image acquiring unit acquiring a face image generated by shooting an image of a face; a face detecting unit detecting a position of the face from the face image acquired by the face image acquiring unit; a face organ detecting unit detecting face organs from the face image in the position of the face detected by the face detecting unit; a switching determining unit performing evaluation of the face organs detected by the face organ detecting unit, and switching between a first face direction estimating method and a second face direction estimating method on a basis of a result of the evaluation; a first face direction estimating unit estimating a direction of the face on a basis of a positional relationship among the face organs detected by the face organ detecting unit when the switching determining unit switches to the first face direction estimating method; and a second face direction estimating unit calculating an amount of movement of the face on a basis of the position of the face detected by the face detecting unit and estimating the face direction on a basis of the amount of movement when the switching determining unit switches to the second face direction estimating method. With this configuration, the high-accuracy first face direction estimating method based on the positional relationship among the face organs is used usually, and, when it is difficult to shoot an image of the entire face and detect the face organs since a part of the face is hidden by a hand or the like or the face is turned sideways, it is possible to switch the estimating method to the second face direction estimating method in which the face direction is estimated on the basis of the amount of movement of the face. As a result, the face direction can be estimated even when it is not possible to shoot an image of the entire face.

Embodiment 2

Figure 6:
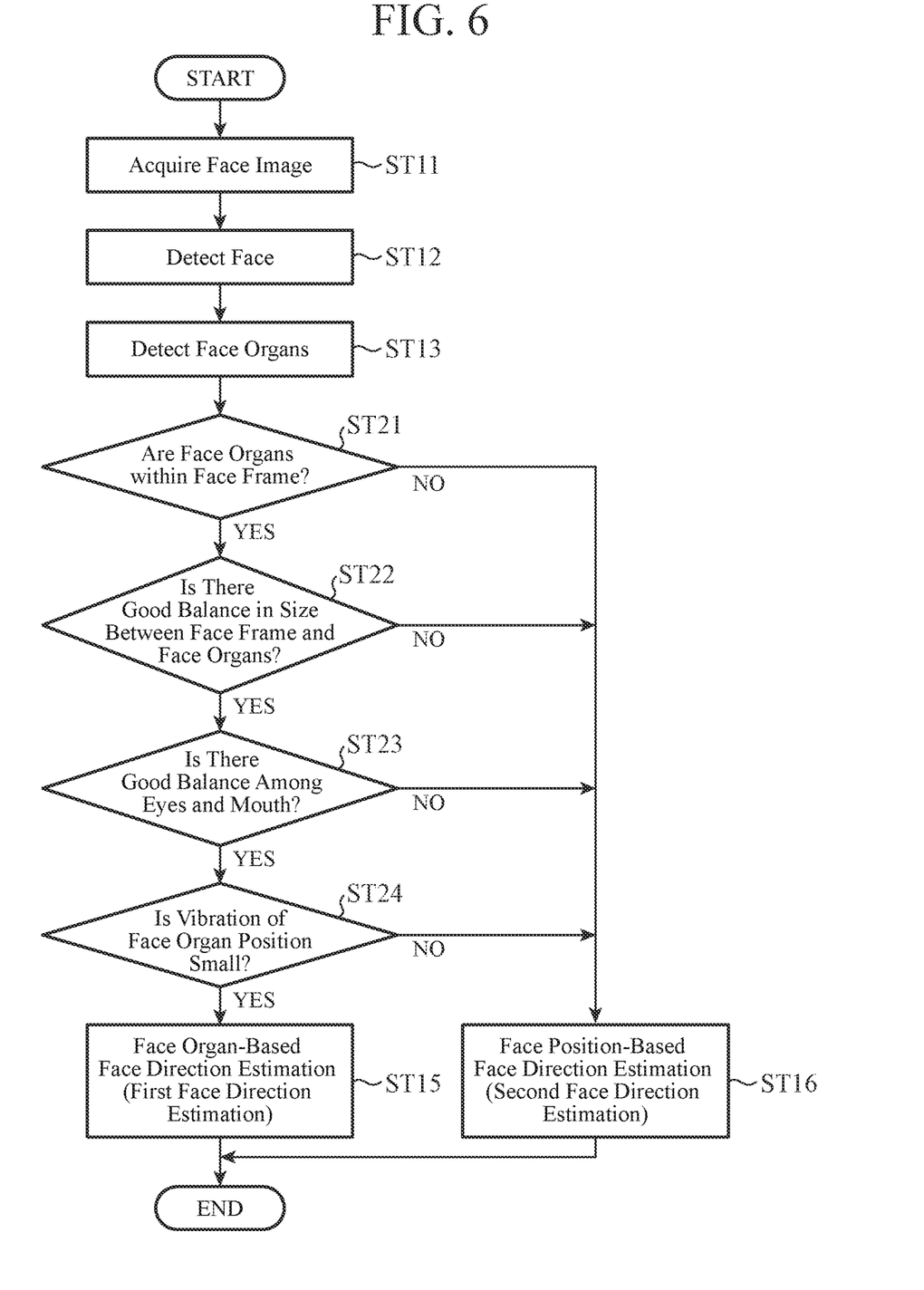
FIG. 6 is a flow chart showing an example of the operation of a face direction estimation device according to Embodiment 2 of the present invention.

FIG. 6 is a flow chart showing an example of the operation of a face direction estimation device 10 according to Embodiment 2 of the present invention. Because the configuration of the face direction estimation device 10 according to Embodiment 2 is the same as that of the face direction estimation device 10 according to Embodiment 1 shown in FIG. 1, an explanation will be made using FIG. 1 hereafter. In Embodiment 1, in step ST14 of FIG. 2, the switching determining unit 14 evaluates the reliability of face organs on the basis of the likelihood of the face organs, and determines whether to switch to either the first face direction estimating method or the second face direction estimating method. On the other hand, in Embodiment 2, in steps ST21 to ST24 of FIG. 6, a switching determining unit 14 evaluates the quality of face organs on the basis of both the position of a face and a positional relationship among the face organs, and determines whether to switch to either the first face direction estimating method or the second face direction estimating method. Because processes of steps ST11 to ST13, ST15, and ST16 in FIG. 6 are the same as those of steps ST11 to ST13, ST15, and ST16 in FIG. 2, an explanation of the processes will be omitted hereafter. Further, FIGS. 7A to 7E are views for explaining a method of evaluating the quality of face organs in Embodiment 2 of the present invention.

Figure 7A:
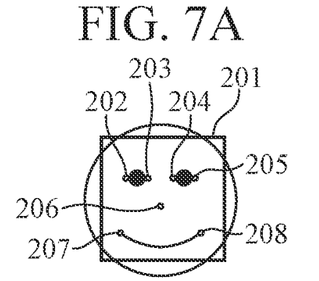
FIGS. 7A to 7E are views explaining a method of evaluating the quality of face organs in Embodiment 2 of the present invention.

The switching determining unit 14 of Embodiment 2 evaluates, as evaluation of the quality of face organs, whether or not the face organs are unnatural as the human face on the basis of the face position detected by a face detecting unit and the positional relationship among the face organs detected by a face organ detecting unit 13. As shown in FIG. 7A, a face frame 201 is an area showing the position of the face detected by the face detecting unit 12. A right outer eye corner 202, a right inner eye corner 203, a left inner eye corner 204, a left outer eye corner 205, a nose 206, a right mouth corner 207, and a left mouth corner 208 are face organs detected by the face organ detecting unit 13. In FIG. 7A, the face frame 201, the right outer eye corner 202, the right inner eye corner 203, the left inner eye corner 204, the left outer eye corner 205, the nose 206, the right mouth corner 207, and the left mouth corner 208 are detected correctly, and the quality of these face organs are evaluated to be high.

In step ST21, the switching determining unit 14 evaluates the quality of the face organs from the viewpoint of whether or not the face organs are within the face frame. When the face organs are within the face frame ("YES" in step ST21), the switching determining unit 14 proceeds to step ST22, whereas when one or more of the face organs are not within the face frame, the switching determining unit 14 determines that the quality is low ("NO" in step ST22), and switches to the second face direction estimating method executed by a second face direction estimating unit 16 (step ST16).

Figure 7B:
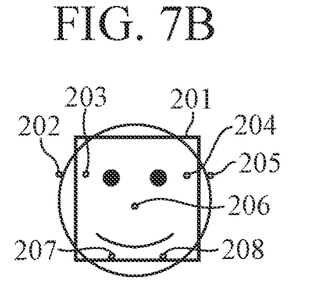

When the right outer eye corner 202 and the left outer eye corner 205 are not within the face frame 201, as shown in FIG. 7B, it is evaluated that the quality of the face organs is low.

In step ST22, the switching determining unit 14 evaluates the quality of the face organs from the viewpoint of whether or not the face organs are extremely small relative to the face frame. When there is a good balance between the size of an area including the face organs and the size of the face frame ("YES" in step ST22), the switching determining unit 14 proceeds to step ST23, whereas when the area including the face organs is extremely small relative to the face frame, the switching determining unit determines that the quality is low ("NO" in step ST22), and switches to the second face direction estimating method executed by the second face direction estimating unit 16 (step ST16).

Figure 7C:
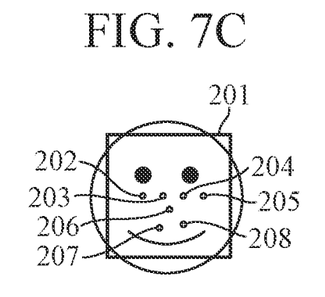

When the size of the area including the right outer eye corner 202, the right inner eye corner 203, the left inner eye corner 204, the left outer eye corner 205, the nose 206, the right mouth corner 207, and the left mouth corner 208 is extremely small relative to the size of the face frame 201, as shown in FIG. 7C, it is evaluated that the quality of the face organs is low. It is assumed that information about an evaluation criterion as to how much the size of the area including the face organs is evaluated as "extremely small" is preset to the switching determining unit 14.

In step ST23, the switching determining unit 14 evaluates the quality of the face organs from the viewpoint of whether or not the positional relationship among the eyes and the mouth is unnaturally distorted. When the balance among the eyes and the mouth is good ("YES" in step ST23), the switching determining unit 14 proceeds to the process at step ST24, whereas when the balance among the eyes and the mouth is not good, the switching determining unit 14 determines that the quality is low ("NO" in step ST23), and switches to the second face direction estimating method executed by the second face direction estimating unit 16 (step ST16).

Figure 7D:
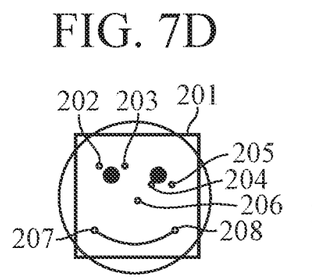

When the balance among the right outer eye corner 202, the right inner eye corner 203, the left inner eye corner 204, the left outer eye corner 205, the right mouth corner 207, and the left mouth corner 208 is not good, as shown in FIG. 7D, the quality of the face organs is evaluated to be low. It is assumed that information for determining a positional relationship among eyes and a mouth to have a "good balance" and information for determining a positional relationship among eyes and a mouth to have a "not good" balance are preset to the switching determining unit 14.

In step ST24, the switching determining unit 14 evaluates the quality of the face organs from the viewpoint of whether or not the position of a face organ has been vibrating over multiple face images that have been shot during a time period from a predetermined time before the current time to the current time. When the amount of movement from the position of a face organ in a face image that was shot a predetermined time before the current time to the position of the face organ in a face image that is shot this time is less than a predetermined amount of movement ("YES" in step ST24), the switching determining unit 14 switches to the first face direction estimating method executed by a first face direction estimating unit 15 (step ST15). On the other hand, when the amount of movement from the position of the face organ in the face image that was shot the predetermined time before the current time to the position of the face organ in the face image that is shot this time is equal to or greater than the predetermined amount of movement ("NO" in step ST24), the switching determining unit 14 determines that the quality of the face organs is low, and switches to the second face direction estimating method executed by the second face direction estimating unit 16 (step ST16).

Figure 7E:
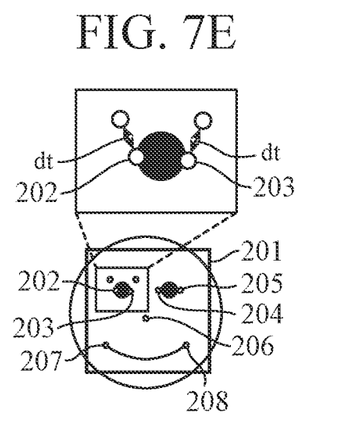

When either the amount of movement dt of the right outer eye corner 202 per unit time or the amount of movement dt of the right inner eye corner 203 per unit time is large, as shown in FIG. 7E, it is evaluated that the position of the face organ is vibrating and the quality of the face organs is low.

In the example of FIG. 6, when the quality is evaluated to be low with respect to any one of the four viewpoints shown in steps ST21 to ST24, the switching determining unit 14 switches to the second face direction estimating method of step ST16. However, no limitation is intended to this example, and alternatively, the switching determining unit 14 may be designed to switch to the second face direction estimating method of step ST16 when the quality is evaluated to be low with respect to the majority of the four viewpoints shown in steps ST21 to ST24, for example.

Further, the switching determining unit 14 evaluates the quality from the four viewpoints of steps ST21 to ST24. However, no limitation is intended to this example, and the switching determining unit 14 may evaluate the quality from at least one of the viewpoints shown in steps ST21 to ST24.

As described above, the switching determining unit 14 in Embodiment 2 evaluates the quality of face organs on the basis of both the position of a face detected by the face detecting unit 12 and the positional relationship among the face organs detected by the face organ detecting unit 13, and, when the quality is high, the switching determining unit 14 switches to the estimating method executed by the first face direction estimating unit 15, whereas when the quality is low, the switching determining unit 14 switches to the estimating method executed by the second face direction estimating unit 16. Thus, on the basis of the evaluation of the face organs from the viewpoint of whether or not the face organs are unnatural as the human face, the switching between the estimating methods can be performed.

Embodiment 3

Figure 8:
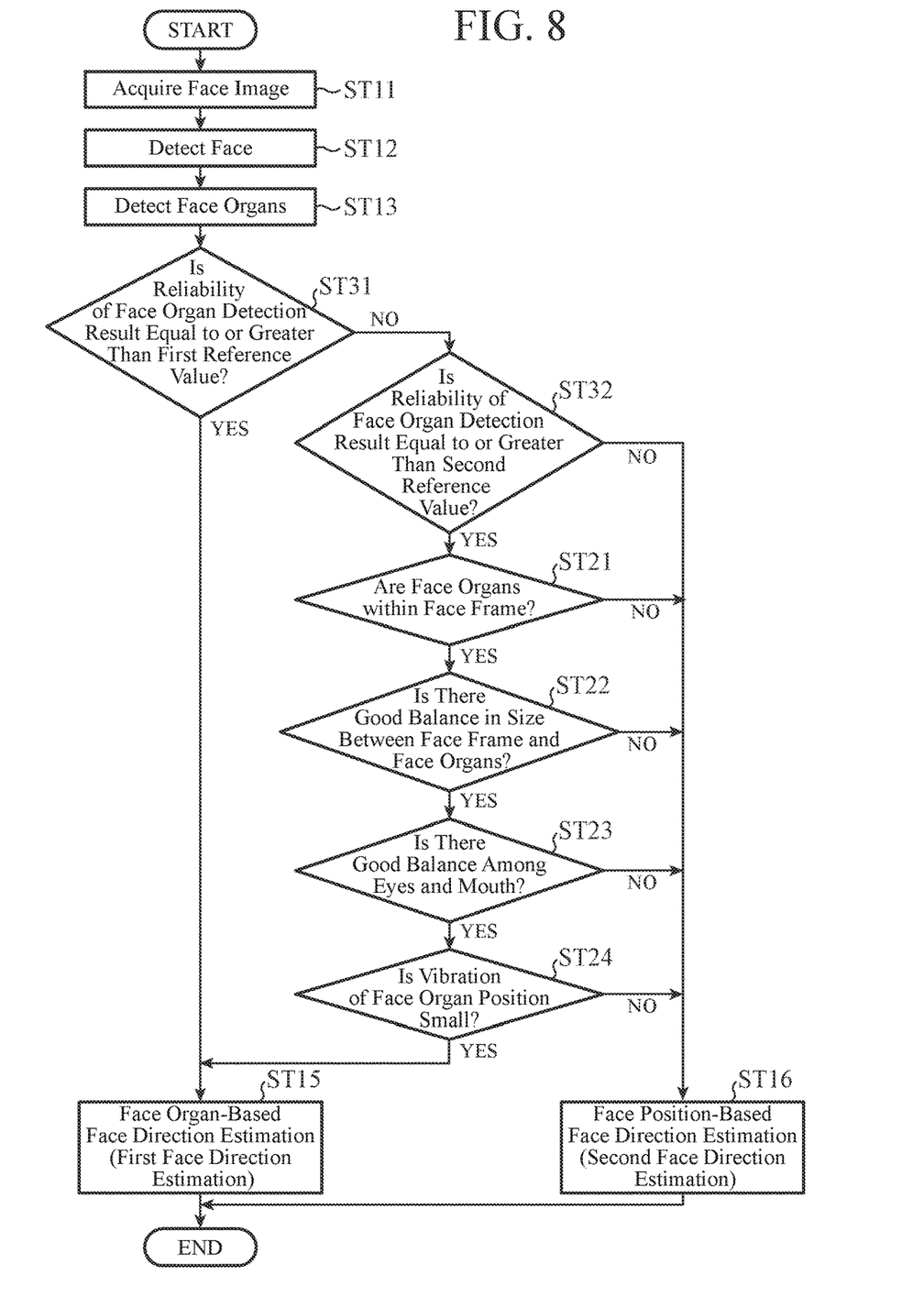
FIG. 8 is a flow chart showing an example of the operation of a face direction estimation device according to Embodiment 3 of the present invention.

FIG. 8 is a flowchart showing an example of the operation of a face direction estimation device 10 according to Embodiment 3 of the present invention. Because the configuration of the face direction estimation device 10 according to Embodiment 3 is the same as that of the face direction estimation device 10 according to Embodiment 1 shown in FIG. 1, an explanation will be made using FIG. 1 hereafter.

In Embodiment 1, in step ST14 of FIG. 2, the switching determining unit 14 evaluates the reliability of face organs on the basis of the likelihood of the face organs, and determines whether to switch to either the first face direction estimating method or the second face direction estimating method. In Embodiment 2, in steps ST21 to ST24 of FIG. 6, the switching determining unit 14 evaluates the quality of face organs on the basis of both the position of the face and the positional relationship among the face organs, and determines whether to switch to either the first face direction estimating method or the second face direction estimating method. In contrast to this, in Embodiment 3, a switching determining unit 14 combines the evaluation according to Embodiment 1 of the reliability of face organs, the evaluation being based on the likelihood of the face organs, and the evaluation according to Embodiment 2 of the quality of the face organs, the evaluation being based on both the position of the face and the positional relationship among the face organs, and determines whether to switch to either the first face direction estimating method or the second face direction estimating method. Because processes of steps ST11 to ST13, ST15, ST16, and ST21 to ST24 in FIG. 8 are the same as those of steps ST11 to ST13, ST15, ST16, and ST21 to ST24 in FIGS. 2 and 6, an explanation of the processes will be omitted hereafter.

In step ST31, the switching determining unit 14 evaluates the reliability of face organs detected by a face organ detecting unit 13 using the likelihood of the face organs. The switching determining unit 14 compares a predetermined first reference and the likelihood of the face organs detected by the face organ detecting unit 13, determines that the reliability of the face organs is high when the likelihood is equal to or greater than the first reference ("YES" in step ST31), and switches to the first face direction estimating method executed by a first face direction estimating unit 15 (step ST15). On the other hand, when the likelihood is less than the first reference ("NO" in step ST31), the switching determining unit 14 proceeds to step ST32.

In step ST32, the switching determining unit 14 compares a predetermined second reference and the likelihood of the face organs detected by the face organ detecting unit 13, determines that the reliability of the face organs is low when the likelihood is less than the second reference ("NO" in step ST32), and switches to the second face direction estimating method executed by a second face direction estimating unit 16 (step ST16). On the other hand, when the likelihood is equal to or greater than the second reference ("YES" in step ST32), the switching determining unit 14 proceeds to step ST21 and evaluates the quality of the face organs. The second reference is a value less than the first reference.

As described above, the switching determining unit 14 in Embodiment 3 evaluates reliability of the face organs detected by the face organ detecting unit 13, and evaluates quality of the face organs on a basis of both the position of the face detected by the face detecting unit 12, and the positional relationship among the face organs detected by the face organ detecting unit 13, and switches between the first face direction estimating method and the second face direction estimating method on a basis of a result of the evaluation of the reliability and a result of the evaluation of the quality. As a result, the evaluation can be performed more correctly compared with the case in which only either the reliability or the quality is evaluated.

Embodiment 4

Figure 9:
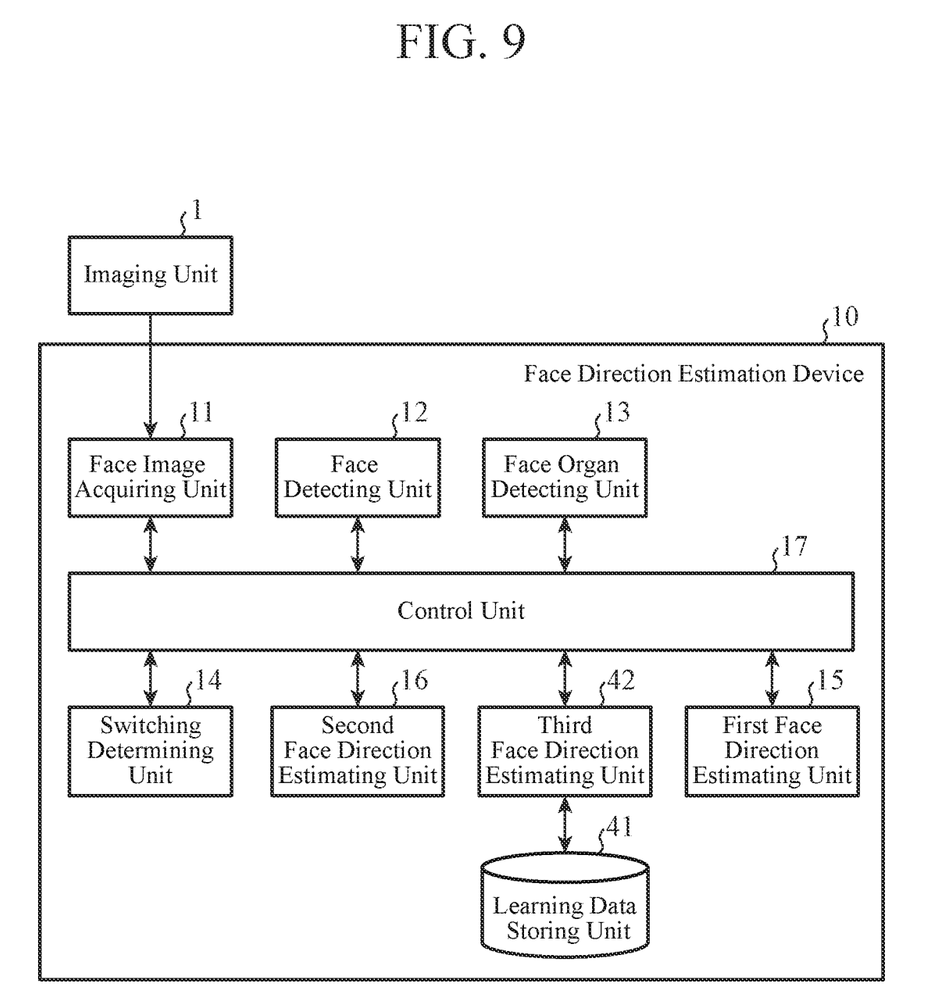
FIG. 9 is a block diagram showing an example of the configuration of a face direction estimation device according to Embodiment 4 of the present invention.

FIG. 9 is a block diagram showing an example of the configuration of a face direction estimation device 10 according to Embodiment 4 of the present invention. The face direction estimation device 10 according to Embodiment 4 has a configuration in which a learning data storing unit 41 and a third face direction estimating unit 42 are added to the face direction estimation device 10 of Embodiment 1 shown in FIG. 1. In FIG. 9, the same components as those of FIG. 1 or like components are denoted by the same reference characters, and an explanation of the components will be omitted hereafter.

In the learning data storing unit 41, learning data that is acquired by learning face directions using sample images is stored. The learning data is, for example, multiple decision trees that are created by learning a lot of sample images by using identification equipment such as Random Forest.

The third face direction estimating unit 42 estimates a face direction from a face image acquired by a face image acquiring unit 11 using the learning data stored in the learning data storing unit 41. In the case of Random Forest, multiple face directions are estimated for a single face image by using the multiple decision trees. The third face direction estimating unit 42 determines one face direction on the basis of both the face direction estimated thereby using the learning data, and a face direction estimated by a second face direction estimating unit 16. The function of the third face direction estimating unit 42 is added in order to enhance the estimation accuracy of the face direction estimating method executed by the second face direction estimating unit 16.

Figure 10:
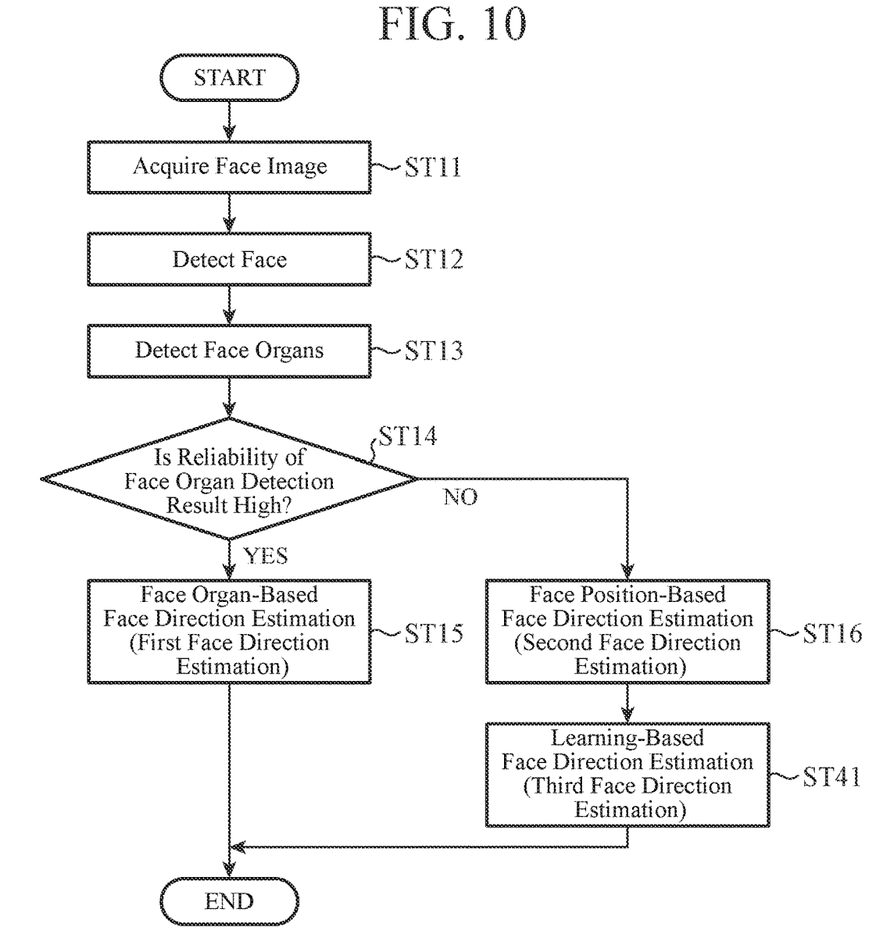
FIG. 10 is a flow chart showing an example of the operation of the face direction estimation device according to Embodiment 4 of the present invention.

FIG. 10 is a flowchart showing an example of the operation of the face direction estimation device 10 according to Embodiment 4 of the present invention. Because processes of steps ST11 to ST16 in FIG. 10 are the same as those of steps ST11 to ST16 in FIG. 2, an explanation of the processes will be omitted hereafter. Further, instead of the process of step ST14 in FIG. 10, either the processes of steps ST21 to ST24 in FIG. 6 or the processes of steps ST31, ST32, and ST21 to ST24 in FIG. 8 may be performed.

In step ST41, the third face direction estimating unit 42 receives the face image acquired by the face image acquiring unit 11 and information about the face direction estimated by the second face direction estimating unit 16 from a control unit 17. The third face direction estimating unit 42 estimates one or more face directions from the face image acquired by the face image acquiring unit 11 using the learning data stored in the learning data storing unit 41. Then, the third face direction estimating unit 42 determines one face direction by majority decision from the one or more face directions estimated using the learning data and the face direction estimated by the second face direction estimating unit 16, for example. As an alternative, the third face direction estimating unit 42 may determine the average of both the one or more face directions estimated using the learning data, and the face direction estimated by the second face direction estimating unit 16. In the third face direction estimating unit 42, a method of determining one face direction that is finally outputted is limited to neither the determination by majority decision nor the averaging.

The third face direction estimating unit 42 may correct the face directions estimated using the learning data on the basis of the face direction estimated by the second face direction estimating unit 16, and determine one face direction on the basis of the one or more face directions corrected thereby. Hereafter, the face direction estimating method executed by the third face direction estimating unit 42 will be explained with reference to FIG. 11.

Figure 11:
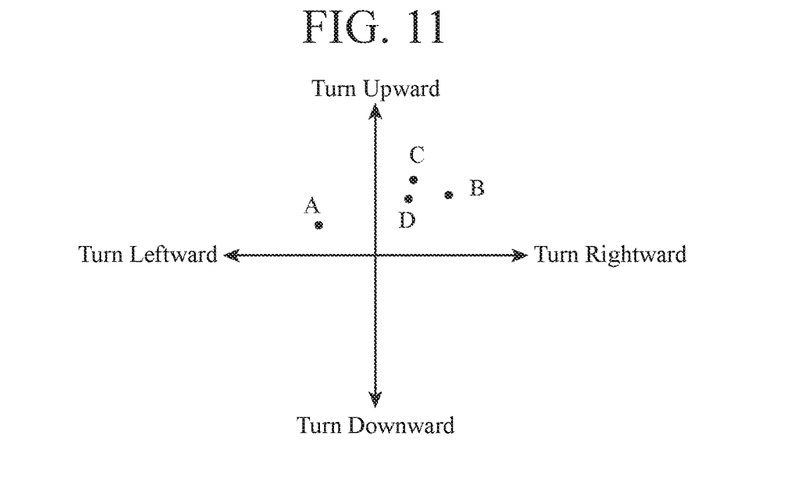
FIG. 11 is a view explaining a third face direction estimating method in Embodiment 4 of the present invention.

FIG. 11 is a view explaining the third face direction estimating method in Embodiment 4 of the present invention. The vertical axis shows a face direction with respect to the vertical direction, and the horizontal axis shows a face direction with respect to the horizontal direction. In the example of FIG. 11, the third face direction estimating unit 42 estimates face directions A, B, and C using the learning data, and also calculates the likelihood of each of the face directions A, B, and C. On the other hand, it is assumed that the second face direction estimating unit 16 estimates a face direction D. In this case, the third face direction estimating unit 42 assigns a large weight to the likelihood of the face direction C, which is the nearest to the face direction D, out of the face directions A to C, and sets a weight that becomes small with increasing deviation from the face direction D, and, after that, performs the majority decision or the averaging in consideration of the weight assigned to the likelihood of each of the face directions. The weighting at this time corresponds to the above-mentioned "correction." As a result, a face direction, out of the one or more face directions estimated using the learning data, which is considerably different from the face direction estimated by the second face direction estimating unit 16 can be excluded.

As described above, the face direction estimation device 10 according to Embodiment 4 has a configuration including: a learning data storing unit 41 storing learning data acquired by learning face directions using sample images; and a third face direction estimating unit 42 performing estimation of the face direction from the face image acquired by the face image acquiring unit 11 using the learning data, and determining one face direction on a basis of both the face direction obtained by the estimation performed by the third face direction estimating unit and the face direction estimated by the second face direction estimating unit 16. With this configuration, the accuracy of estimating a face direction by the second face direction estimating unit 16 can be enhanced.

Further, the third face direction estimating unit 42 in Embodiment 4 may has a configuration to correct the face direction, obtained by the estimation using the learning data, on a basis of the face direction estimated by the second face direction estimating unit 16, and determine the one face direction on a basis of the face direction being corrected. With this configuration, erroneous estimation in the face direction estimating method using the learning data can be suppressed.

Figure 12:
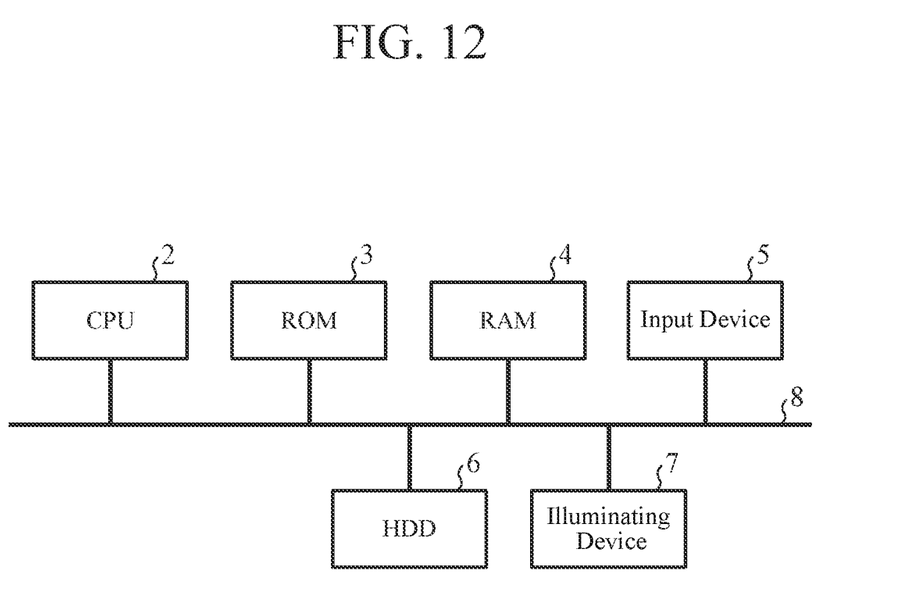
FIG. 12 is a view showing an example of a hardware configuration of the face direction estimation device according to each of the embodiments of the present invention.

Finally, an example of the hardware configuration of the face direction estimation device 10 according to each of the embodiments of the present invention will be explained. FIG. 12 is a view showing an example of the hardware configuration of the face direction estimation device 10 according to each of the embodiments of the present invention.

Each of the functions of the face detecting unit 12, the face organ detecting unit 13, the switching determining unit 14, the first face direction estimating unit 15, the second face direction estimating unit 16, the control unit 17, and the third face direction estimating unit 42 in the face direction estimation device 10 is implemented by a processing circuit. The processing circuit is a CPU (Central Processing Unit) 2 that executes a program stored in a ROM (Read Only Memory) 3 or an HDD (Hard Disk Drive) 6.

Each of the functions of the face detecting unit 12, the face organ detecting unit 13, the switching determining unit 14, the first face direction estimating unit 15, the second face direction estimating unit 16, the control unit 17, and the third face direction estimating unit 42 is implemented by software, firmware, or a combination of software and firmware. Software or firmware is described as a program, and the program is stored in the ROM 3 or the HDD 6. The CPU 2 implements the function of each of the units by reading the program stored in the ROM 3 or the HDD 6 into a RAM (Random Access Memory) 4, and executing the program.

Namely, the face direction estimation device 10 includes the ROM 3 or the HDD 6 for storing the program by which the steps shown in the flow charts, such as the one of FIG. 2, are performed as a result when the program is executed by the CPU 2. Further, it can be said that this program causes a computer to perform procedures or methods of the face detecting unit 12, the face organ detecting unit 13, the switching determining unit 14, the first face direction estimating unit 15, the second face direction estimating unit 16, the control unit 17, and the third face direction estimating unit 42.

The CPU 2, the ROM 3, the RAM 4, an input device 5, and the HDD 6 are connected via a bus 8 or the like in such a way that information can be transferred. The face image acquiring unit 11 in the face direction estimation device 10 is the input device 5 to which a face image is inputted from the imaging unit 1. In addition, an illuminating device 7 for illuminating a face with light when the imaging unit 1 shoots an image may be connected to the bus 8.

The learning data storing unit 41 in the face direction estimation device 10 is the ROM 3 or the HDD 6.

It is to be understood that any combination of two or more of the above-described embodiments can be made, various changes can be made in any component according to any one of the above-mentioned embodiments, and any component according to any one of the above-mentioned embodiments can be omitted within the scope of the present invention.

Further, although the case in which the face direction estimation device 10 is mounted in a vehicle is shown as an example in Embodiments 1 to 4, some of the functions of the face direction estimation devices 10 may be installed in the vehicle, and the remaining functions may be installed outside the vehicle. For example, in a case in which a vehicle-mounted device and a server device are connected in such a way that wireless communications can be performed, the vehicle-mounted device includes the imaging unit 1 and the face image acquiring unit 11 and transmits a face image to the server device. The server device includes the face detecting unit 12, the face organ detecting unit 13, the switching determining unit 14, the first face direction estimating unit 15, the second face direction estimating unit 16, the learning data storing unit 41, and the third face direction estimating unit 42, estimates a face direction using the face image received from the vehicle-mounted device, and sends a result of the estimation to the vehicle-mounted device. The server device may not necessarily include the function of estimating a face direction, and a mobile information terminal such as a smartphone may include the function. As an alternative, a configuration may be provided in which a smartphone or the like includes the imaging unit 1 and the face image acquiring unit 11, a face image is transmitted from the smartphone to the server device, and the server device transmits a result of estimating a face direction to the vehicle-mounted device.

INDUSTRIAL APPLICABILITY

Because the face direction estimation device according to the present invention can estimate the direction of a face even when it is failed to shoot an image of the entire face, it is suitable for use as a face direction estimation device or the like that estimates the direction of the face of an occupant in a moving object such as a vehicle, a railway car, a ship, or an airplane.

REFERENCE SIGNS LIST 1 imaging unit, 2 CPU, 3 ROM, 4 RAM, 5 input device, 6 HDD, 7 illuminating device, 8 bus, 10 face direction estimation device, 11 face image acquiring unit, 12 face detecting unit, 13 face organ detecting unit, 14 switching determining unit, 15 first face direction estimating unit, 16 second face direction estimating unit, 17 control unit, 41 learning data storage unit, 42 third face direction estimation unit, 101, 102 face area, 201 face frame, 202 right outer eye corner, 203 right inner eye corner, 204 left inner eye corner, 205 left outer eye corner, 206 nose, 207 right mouth corner, and 208 left mouth corner.

The invention claimed is:

1. A face direction estimation device comprising:
a processor to execute a program; and
a memory to store the program which, when executed by the processor, performs processes of,
acquiring a face image generated by shooting an image of a face;
detecting a position of the face from the face image;
detecting face organs from the face image in the position of the face;
performing evaluation of the face organs, and switching between a first face direction estimating method and a second face direction estimating method on a basis of a result of the evaluation;
estimating a direction of the face on a basis of a positional relationship among the face organs when the switching is performed to be switched to the first face direction estimating method; and
calculating an amount of movement of the face on a basis of the position of the face and estimating the face direction on a basis of the amount of movement when the switching is performed to be switched to the second face direction estimating method,
wherein the performing the evaluation of the face organs includes: evaluating reliability of the face organs; and evaluating quality of the face organs on a basis of both the position of the face, and a level of distortion corresponding to whether or not the positional relationship among the face organs is unnaturally distorted, and the switching includes: switching between the first face direction estimating method and the second face direction estimating method on a basis of a result of the evaluation of the reliability and a result of the evaluating the quality, and
wherein the evaluating the quality of the face organs includes determining whether or not the positional relationship among the face organs is unnaturally distorted, on a basis of an analysis of a level of balance among one organ in the face organs and another face organ in the face organs.

2. A face direction estimation device comprising:
a processor to execute a program; and
a memory to store the program which, when executed by the processor, performs processes of,
acquiring a face image generated by shooting an image of a face;
detecting a position of the face from the face image;
detecting face organs from the face image in the position of the face;
performing evaluation of the face organs, and switching between a first face direction estimating method and a second face direction estimating method on a basis of a result of the evaluation;
estimating a direction of the face on a basis of a positional relationship among the face organs when the switching is performed to be switched to the first face direction estimating method;

calculating an amount of movement of the face on a basis of the position of the face and estimating the face direction on a basis of the amount of movement when the switching is performed to be switched to the second face direction estimating method;

storing learning data that corresponds to multiple decision trees, the learning data being acquired by learning face directions using sample images; and performing estimation of a plurality of face directions from the face image using the multiple decision trees of the learning data, correcting the plurality of face directions obtained by the estimation using the multiple decision trees of the learning data on a basis of the face direction estimated by the estimating the face direction on the basis of the amount of movement, and acquiring one face direction on a basis of the corrected plurality of face directions, wherein correcting the plurality of face directions is based on a calculation of a likelihood of each of the plurality of face directions obtained by the estimation using the multiple decision trees and an assignment of a weight to each of the obtained plurality of face directions.

3. A face direction estimation method comprising the steps of:

acquiring a face image generated by shooting an image of a face;

detecting a position of the face from the face image;

detecting face organs from the face image in the position of the face;

performing evaluation of the face organs, and switching between a first face direction estimating method and a second face direction estimating method on a basis of a result of the evaluation;

estimating a direction of the face on a basis of a positional relationship among the face organs when the switching is performed to be switched to the first face direction estimating method; and calculating an amount of movement of the face on a basis of the position of the face and estimating the face direction on a basis of the amount of movement when the switching is performed to be switched to the second face direction estimating method, wherein the performing the evaluation of the face organs includes: evaluating reliability of the face organs; and evaluating quality of the face organs on a basis of both the position of the face, and a level of distortion corresponding to whether or not the positional relationship among the face organs is unnaturally distorted, and the switching includes: switching between the first face direction estimating method and the second face direction estimating method on a basis of a result of the evaluation of the reliability and a result of the evaluating the quality, and wherein the evaluating the quality of the face organs includes determining whether or not the positional relationship among the face organs is unnaturally distorted, on a basis of an analysis of a level of balance among one organ in the face organs and another face organ in the face organs.

4. A face direction estimation method comprising the steps of:

acquiring a face image generated by shooting an image of a face;

detecting a position of the face from the face image;

detecting face organs from the face image in the position of the face;

performing evaluation of the face organs, and switching between a first face direction estimating method and a second face direction estimating method on a basis of a result of the evaluation;

estimating a direction of the face on a basis of a positional relationship among the face organs when the switching is performed to be switched to the first face direction estimating method;

calculating an amount of movement of the face on a basis of the position of the face and estimating the face direction on a basis of the amount of movement when the switching is performed to be switched to the second face direction estimating method, and performing estimation of a plurality of face directions from the face image using learning data that corresponds to multiple decision trees, the learning data being acquired by learning face directions using sample images, correcting the plurality of face directions obtained by the estimation using the multiple decision trees of the learning data on a basis of the face direction estimated by the estimating the face direction on the basis of the amount of movement, and acquiring one face direction on a basis of the corrected plurality of face directions, wherein correcting the plurality of face directions is based on a calculation of a likelihood of each of the plurality of face directions obtained by the estimation using the multiple decision trees and an assignment of a weight to each of the obtained plurality of face directions.

* * * * *